March 28, 1950     J. H. KIRKPATRICK, JR     2,501,681
ELECTRIC POWER SUPPLY CIRCUIT
Filed March 28, 1945
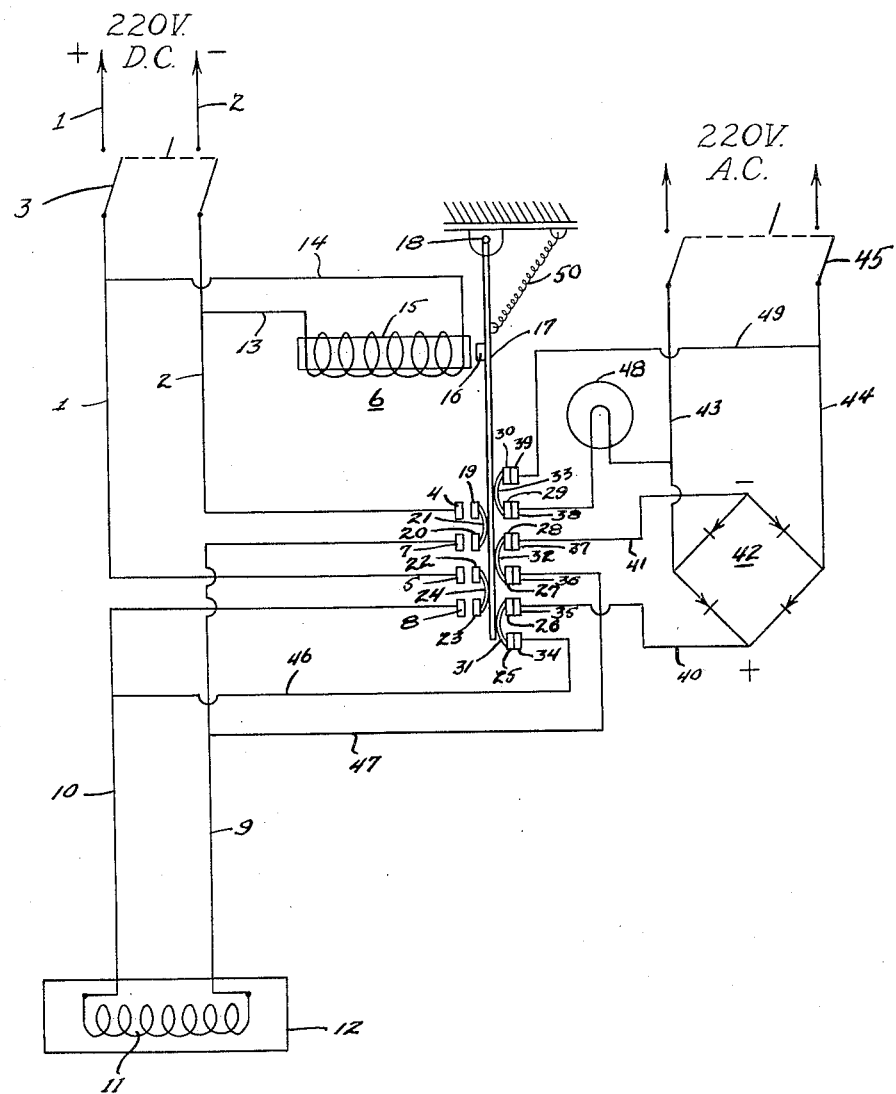
INVENTOR.
JOSEPH H. KIRKPATRICK JR.
BY Ralph L. Chappell
ATTORNEY Patented Mar. 28, 1950

2,501,681

UNITED STATES PATENT OFFICE 2,501,681

ELECTRIC POWER SUPPLY CIRCUIT

Joseph H. Kirkpatrick, Jr., Darby, Pa.

Application March 28, 1945, Serial No. 585,374

2 Claims. (Cl. 171—97)

(Granted under the act of March 3, 1883, as amended April 30, 1928; 370 O. G. 757)

This invention relates to new and useful improvements in electric power supply circuits, and more particularly to automatic power transfer circuits for magnetic chucks and like industrial equipment.

In certain types of industrial machinery, and particularly grinding and abrading machines, it is the general practice to employ in conjunction with such machines electro-magnetic chucks for securely holding the work properly positioned in the machine while rotating it at high speed during the performance of grinding and other machining operations thereon. While these electromagnetic chucks are well suited to effectively and securely hold the work in machines of this type, their use does present a substantial danger of injury to plant personnel, to other machinery and to the work, for in the event of a failure or interruption of the electric power supply to the chuck while a machine is in operation with the work rotating at high speed, the work is immediately released by the chuck with the result that it is hurled outwardly from the machine at a velocity sufficient not only to severely injure or kill any person that it may strike, but also to seriously damage adjacent machinery in the plant and the work itself.

With the foregoing in mind, the principal object of the present invention is to provide, in conjunction with the primary electric power supply to an electrical device, an auxiliary electric power supply that is operatively connected to said device upon a failure or interruption of the primary power supply.

Another object of the invention is to provide an auxiliary electric power supply as described that is rendered operative automatically by a failure or interruption of the primary power supply.

A further object of the invention is to provide an auxiliary power supply for the electro-magnetic work holding chucks of industrial machinery having the stated characteristics wherein the change-over from the primary to the auxiliary power supply is effected instantaneously and with sufficient rapidity that there is no interruption in the holding action of the chuck upon the work.

Still another object of the invention is to provide a transfer apparatus for automatically rendering a direct current device operable from an auxiliary alternating current supply line whenever the primary direct current supply line fails.

Still a further object of the invention is to provide an auxiliary power supply of the stated type which is relatively simplified, comparatively inexpensive to install and fool-proof in operation.

These and other objects of the invention and the various features and details of the construction and operation thereof are hereinafter fully set forth and described with reference to the accompanying drawing in which the single figure is a circuit diagram of an electric power supply system embodying the present invention.

Referring now more particularly to the drawing, reference numerals 1 and 2 designate a pair of primary current conductors that lead from a direct current voltage source, for example 220 volts, through a suitable double-pole main control switch 3 to fixed contacts 4 and 5, respectively, of a multiple contact self-locking relay switch generally designated 6. Paired with respect to these fixed contacts 4 and 5, and forming a part of the switch 6, are fixed contacts 7 and 8, respectively, that are connected by means of suitable conductors 9 and 10 to the terminals of the coil 11 of an electro-magnetic chuck device 12.

Connected across the line conductors 1 and 2 by conductors 13 and 14 is the coil 15 of the relay switch 6 previously mentioned, and operatively associated with said coil 15 is an armature 16 carried by a switch arm 17 of electrically non-conductive material that is pivotally connected, as indicated at 18, to a suitable support structure. Carried also by the switch arm 17, and arranged for contact with the fixed contacts 4 and 7 of the switch 6, are a pair of contacts 19 and 20 mounted at opposite ends of a resilient strip 21 having good electrical conductivity that is secured to the switch arm 17. Similarly, a second pair of contacts 22 and 23 are carried by the arm 17 and arranged to engage the fixed contacts 5 and 8 of the switch 6. These contacts 22 and 23 likewise are mounted at opposite ends of a resilient electrically conductive strip 24 that is secured to the switch arm 17.

In addition to the foregoing, there is carried by the switch arm 17, a third pair of contacts 25 and 26, a fourth pair of contacts 27 and 28 and a fifth pair of contacts 29 and 30, the contacts of each such pair being mounted at the opposite ends of resilient electrically conductive strips 31, 32 and 33, respectively, that are secured to the switch arm 17 at the opposite side thereof from the strips 21 and 24. The contacts 25 and 26 are arranged for engagement with fixed contacts 34 and 35, while the contacts 27 and 28 are arranged for engagement with fixed contacts 36 and 37 and contacts 29 and 30 are arranged for engagement with fixed contacts 38 and 39 respectively.

As shown in the drawing, the fixed contacts 35 and 37 are connected, respectively, by conductors 40 and 41 to the positive and negative output terminals of a full-wave, bridge type rectifier 42, the input terminals of which are connected by means of conductors 43 and 44 through a switch 45 to a suitable alternating current voltage source, for example, 220 volts. The fixed contacts 34 and 36 are connected, respectively, by means of conductors 46 and 47, to the conductors 10 and 9 that lead to the coil 11 of the magnetic chuck 12 as previously described. In addition, the contact 38 is connected through a signal device 48, for example, an incandescent lamp, electric bell, or the like, to the rectifier input conductor 43 and the contact 39 is suitably connected by a conductor 49 to the other rectifier input conductor 44.

Referring again to the relay switch 6, it is to be noted that when the coil 15 thereof is deenergized, for example, when switch 3 is open, the relay switch arm 17 and its armature 16 are biased outwardly from the coil 15 by means of a spring or like tension device 50 that is connected between said arm 17 and the fixed support to which the said arm is pivotally connected. Furthermore, the several pairs or sets of contacts of the switch 6 are arranged so that when said coil 15 is deenergized, the contacts 25, 26, 27, 28, 29 and 30 carried by the switch arm 17 are closed upon, or engaged with, the fixed contacts 34, 35, 36, 37, 38 and 39, respectively, and the contacts 19, 20, 22 and 23, also carried by the switch arm 17, are open with respect to fixed contacts 4, 7, 5 and 8, respectively, as shown in the drawing.

In operation, when it is desired to energize the magnetic chuck 12 to secure a piece of work properly in position to be rotationally driven for the performance of a grinding or other machining operation thereon, the switches 3 and 45 are first closed. Closing of the switch 3 causes the coil 15 of the relay switch 6 to be energized thereby actuating the armature 16 and switch arm 17 against spring 50 to the left with respect to the drawing and causing the contacts 19, 20, 22 and 23 to close upon the fixed contacts 4, 7, 5 and 8, respectively, and at the same time opening the contacts 25, 26, 27, 28, 29 and 30 with respect to their associated fixed contacts 34, 35, 36, 37, 38 and 39.

Closing of the contacts 19, 20, 22 and 23 with their associated contacts 4, 7, 5 and 8 completes an electric circuit from the primary direct current voltage source through the conductors 1 and 10, 2 and 9 to the coil 11 of the electro-magnetic chuck 12 thereby energizing the latter so that a piece of work is securely held in position for performing work thereon, and this condition will continue to exist until the job upon the work is completed and the system shut down by opening switches 3 and 45, or until, during continuance of the job, there occurs a failure or interruption in the flow of current supplied to the chuck 12 from the primary direct current voltage source.

Upon the failure or interruption of the current from the primary voltage source, it will be observed that the coil 15 of the relay switch 6 will be deenergized thereby releasing the armature 16 and switch arm 17 which is actuated to the right with respect to the drawing by the spring 50, thereby closing the contacts 25, 26, 27, 28, 29 and 30 with the fixed contacts 34, 35, 36, 37, 38 and 39, respectively, while at the same time opening the contacts 19, 20, 22 and 23 with respect to their associated fixed contacts 4, 7, 5 and 8.

Closing of the contacts 25, 26, 27 and 28 with the fixed contacts 34, 35, 36 and 37, respectively, completes an electric circuit from the auxiliary voltage source through conductors 43 and 44, the rectifier 42, the conductors 40 and 41 and conductors 46 and 47, through the conductors 10 and 9 to the coil 11 of the electro-magnetic chuck 12 thereby energizing the latter. Simultaneously, the closing of contacts 29 and 30 with their contacts 38 and 39, completes a circuit through the signal device 48 thereby energizing it to indicate a failure or interruption in the primary power supply and the establishment or change over to the auxiliary power supply.

The relay switch 6 is of the high speed or quick acting type so that a change over from the primary to the auxiliary power supply is accomplished without permitting the chuck 12 to release the work held thereby, and in practicing the invention a change over from the primary to the auxiliary power supply has been effected satisfactorily in about $1/120$ of a second without interruption in the holding power of the chuck 12 upon the work held thereby.

Upon a failure or interruption of the primary power supply and change over to the auxiliary supply as evidenced by energization of the signal device 48, the machine or equipment with which the chuck 12 is asociated, is stopped and repairs made to the primary power supply, it not being the intention to utilize the auxiliary power supply for continued operation, but principally to prevent release of the work from the chuck until the machine can be shut down and the primary power supply repaired or reestablished.

From the foregoing, it will be observed that the present invention provides in conjunction with a primary electric power supply to an electrical device, an auxiliary power supply that is operatively connected automatically to said device upon a failure or interruption of the primary power supply. Furthermore, the invention provides an auxiliary electric power supply for the electro-magnetic work holding chucks of industrial machinery wherein the change over from the primary to the auxiliary power supply is effected instantaneously and with sufficient rapidity that there is no interruption in the holding action of the chuck upon the work. The invention is also relatively simplified, comparatively inexpensive to install and fool-proof in operation.

While a particular embodiment of the invention has been illustrated and described herein, it is not intended that the invention be limited to such disclosure, and changes and modifications may be made and incorporated within the scope of the claims.

The invention described herein may be manufactured and used by or for the Government of the United States of America for governmental purposes without the payment of any royalties thereon or therefor.

I claim:

1. In combination with the conductor terminals of a primary direct current supply line and an auxiliary alternating current supply line, transfer apparatus for automatically rendering a direct current device operable from said auxiliary supply line whenever said primary supply line fails, said apparatus comprising a pendulous switch arm having a plurality of pairs of contacts resiliently mounted on opposite sides thereof, a pair of fixed contacts connected to opposite terminals of said primary line, respectively, and positioned in confronting relationship with one pair of contacts on one side of said arm, a pair of fixed contacts adapted to be connected to opposite terminals of said device, respectively, and positioned in confronting relationship with another pair of contacts on said one side of said arm, rectifying means coupled to said auxiliary line conductor terminals, a pair of fixed contacts connected across the output end of said rectifying means and positioned in confronting relationship with one pair of contacts on the other side of said arm, a pair of fixed contacts adapted to be connected to opposite terminals of said device and positioned in confronting relationship with another pair of contacts on said other side of said arm, resilient means connected to said arm to bias said arm to close the contacts on said other side of said arm, and electromagnetic means coupled to the primary line terminals to bias said arm against the action of said resilient means to close the contacts on said one side of said arm.

2. In combination with a primary direct current supply line and an auxiliary alternating current supply line, transfer apparatus for automatically rendering a direct current device operable from said auxiliary supply line whenever said primary supply line fails, said apparatus comprising rectifying means connected across said auxiliary line, a pendulous switch arm, resilient means connected to said arm for biasing said arm to connect the output end of said arm to the input end of said device, and electromagnetic means connected across said primary line for biasing said arm against the action of said resilient means to connect said primary line to the input end of said device.

JOSEPH H. KIRKPATRICK, Jr.

REFERENCES CITED

The following references are of record in the file of this patent:

UNITED STATES PATENTS

| Number | Name | Date |
|---|---|---|
| 1,479,808 | Hayward | Jan. 8, 1924 |
| 1,669,784 | Scofield | May 15, 1928 |
| 1,869,330 | Anderson | July 26, 1932 |
| 1,882,473 | Beetem | Oct. 11, 1932 |
| 1,953,602 | Hanley | Apr. 3, 1934 |
| 2,302,192 | Dannheiser | Nov. 17, 1942 |